US007068790B1

(12) United States Patent
Elliott

(10) Patent No.: US 7,068,790 B1
(45) Date of Patent: Jun. 27, 2006

(54) SYSTEMS AND METHODS FOR PATH SET-UP IN A QUANTUM KEY DISTRIBUTION NETWORK

(75) Inventor: Brig Barnum Elliott, Arlington, MA (US)

(73) Assignee: BBN Technologies Corp., Cambridge, MA (US)

( * ) Notice: Subject to any disclaimer, the term of this patent is extended or adjusted under 35 U.S.C. 154(b) by 758 days.

(21) Appl. No.: 09/943,709

(22) Filed: Aug. 31, 2001

(51) Int. Cl.
*H04L 9/00* (2006.01)

(52) U.S. Cl. .................. 380/278; 380/256; 380/283; 398/79

(58) Field of Classification Search .............. 380/278, 380/256, 283; 250/225; 370/216, 399
See application file for complete search history.

(56) References Cited

U.S. PATENT DOCUMENTS

| 5,243,649 | A |   | 9/1993  | Franson ........................ 380/9 |
|-----------|---|---|---------|----------------------------------------|
| 5,307,410 | A |   | 4/1994  | Bennett ....................... 380/21 |
| 5,339,182 | A |   | 8/1994  | Kimble et al. .............. 359/112 |
| 5,400,325 | A | * | 3/1995  | Chatwani et al. ........... 370/399 |
| 5,414,771 | A |   | 5/1995  | Fawcett, Jr. ................. 380/44 |
| 5,675,648 | A | * | 10/1997 | Townsend ................... 380/278 |
| 5,732,139 | A |   | 3/1998  | Lo et al. ....................... 380/28 |
| 5,757,912 | A |   | 5/1998  | Blow ........................... 380/21 |
| 5,764,765 | A |   | 6/1998  | Phoenix et al. .............. 380/21 |
| 5,764,767 | A |   | 6/1998  | Beimel et al. |
| 5,768,378 | A | * | 6/1998  | Townsend et al. .......... 380/256 |
| 5,850,441 | A | * | 12/1998 | Townsend et al. .......... 380/283 |
| 5,911,018 | A |   | 6/1999  | Bischel et al. ............... 385/16 |
| 5,953,421 | A |   | 9/1999  | Townsend ................... 380/21 |
| 5,960,131 | A |   | 9/1999  | Fouquet et al. .............. 385/17 |
| 5,960,133 | A |   | 9/1999  | Tomlinson ................... 385/18 |
| 5,966,224 | A |   | 10/1999 | Hughes et al. .............. 359/112 |
| 6,005,993 | A |   | 12/1999 | MacDonald ................. 385/16 |
| 6,028,935 | A | * | 2/2000  | Rarity et al. ................ 380/256 |
| 6,052,465 | A |   | 4/2000  | Gotoh et al. |
| 6,097,696 | A | * | 8/2000  | Doverspike ................. 370/216 |
| 6,130,780 | A |   | 10/2000 | Jaonnopoulos et al. ..... 359/584 |
| 6,154,586 | A |   | 11/2000 | MacDonald et al. ......... 385/18 |
| 6,160,651 | A | * | 12/2000 | Chang et al. ................ 398/79 |
| 6,256,295 | B1 | * | 7/2001  | Callon ........................ 370/254 |
| 6,507,012 | B1 | * | 1/2003  | Medard et al. ............. 250/225 |

(Continued)

OTHER PUBLICATIONS

DeBashis Basak, Daniel O. Awduche, John Drake and Yakov Redhter, Multi-protocol Lambda Switching: Issues in Combining MPLS Traffic Engineering Control with Optical Cross-connects, IETF Internet Draft Memo, http://www.ietf.org/shadow.html, Feb. 2000, p. 1-9.

(Continued)

*Primary Examiner*—Ayaz Sheikh
*Assistant Examiner*—Arezoo Sherkat
(74) *Attorney, Agent, or Firm*—Fish & Neave IP Group Ropes & Gray LLP

(57) ABSTRACT

A system establishes a path for distributing data through an optical network (115). The system includes an optical switch (205a) and a data distribution endpoint (105a). The optical switch (205a) establishes a first encryption key distribution path through the optical network (115), the first encryption key distribution path including multiple optical switches and optical links. The data distribution endpoint (105a) determines whether eavesdropping has occurred on the first encryption key distribution path using quantum cryptography. The optical switch (205a) further establishes a second data distribution path through the optical network (115) responsive to the eavesdropping determination. The second encryption key distribution path includes multiple optical switches and optical links.

27 Claims, 14 Drawing Sheets

U.S. PATENT DOCUMENTS

| | | |
|---|---|---|
| 6,678,379 B1 * | 1/2004 | Mayers et al. .............. 380/278 |
| 6,778,557 B1 | 8/2004 | Yuki et al. |
| 2003/0231771 A1 | 12/2003 | Gisin et al. |

OTHER PUBLICATIONS

Daniel O. Awduche, Yakov Rekhter, John Drake and Rob Coltun, Multi-protocol Lambda Switching: Combining MPLS Traffic Engineering Control with Optical Crossconnects, IETF Internet Draft Memo, http://www.ietf.org/shadow.html, Jan. 2001, pp. 21.

Charles H. Bennett and Gilles Brassard, Quantum Cryptography: Public Key Distribution and Coin Tossing, Intl. Conf. On Computers, Systems & Signal Processing, Bangalore, India, Dec. 10-12, 1984, 5 Pages.

Donald S. Bethune and William P. Risk, Prototype Autocompensating Quantum Cryptography System Based on Polarization Splitting of Light, Session QC41, DCOMP/CC99: Quantum Computing and Cryptography, Mar. 24, 1999 (4 pages).

D.S. Bethune and W.P. Risk, An Autocompensating Fiber-Optic Quantum Cryptography System Based on Polarization Splitting of Light, IEEE Journal of Quantum Electronics, vol. XX, No. Y, 1999.

Graham P. Collins, Quantum Cryptography Defies Eavesdropping, Physics Today, Nov. 1992, p. 21-23.

L.Y. Lin, E.L. Goldstein and R.W. Tkach, Free-Space Micromachined Optical Switches for Optical Networking, IEEE Journal of Selected Topics in Quantum Electronics, vol. 5, No. 1, Jan./Feb., 1999.

S. Eisenberg and R. Roger, Lucent Technologies names Cherry Murray Physical Sciences Research Vice President, http://www.lucent.com/press/0300/000328.bla.html, Mar. 28, 2000 (2 Pages).

Simon, J.D. Phoenix, Stephen M. Barnett, Paul D. Townsend and K.J. Blow, Multi-user Quantum Cryptography on Optical Networks, Journal of Modern Optics Letter, vol. 42, No. 6, 1995, pp. 1155-1163.

Laser End-Point Detection System, IBM Technical Disclosure Bulletin, vol. 28, No. 7, Dec. 1985, pp. 3151-3163.

E. Rosen, A. Viswanathan and R. Callon, Multiprotocol Label Switching Architecture, Internet Standards Track Protocol, Internet Official Protocol Standards (STD 1), Jan. 2001, pp. 1-61.

P.D. Townsend, J.G. Rarity and P.R. Tapster, Enhanced Single Photon Fringe Visibility in a 10 km-Long Prototype Quantum Cryptography Channel, Electronics Letters, vol. 29, No. 14, Jul. 8, 1993, pp. 1291-1293.

P.D. Townsend, Secure Key Distribution System Based on quantum Cryptography, Electronics Letters, vol. 30, No. 10, May 12, 1994, pp. 809-811.

P.D. Townsend, J.G. Rarity and P.R. Tapster, Single Photon Interference in 10km Long Optical Fiber Interferometer, Electronics Letters, vol. 29, No. 7, Apr. 1, 1993, p. 634-635.

James A. Walker, Telecommunications Applications of MEMS, mstnews, Mar. 2000, p. 6-9.

Cabello, A., "Multiparty key distribution and secret sharing based on entanglement swapping," pp. 1-8 (Sep. 7, 2000).

Crepeau, C., et al., "Secure Multi-party Quantum Computation," ACM, pp. 1-10 (20001).

Gottesman, D., et al., "Secure quantum key distribution using squeezed states," pp. 1-19 (Sep. 25, 2000).

Xiao, L., et al., "Efficient Multi-Party Quantum Secret Sharing Schemes," pp. 1-7 (May 28, 2004).

Bennett, C.H. Quantum Cryptography Using Any Two Nonorthogonal States. Physical Review Letters, 68:21, 3121-24 (1992).

Buttler, W.T. et al. Free-space quantum-key distribution, Physical Review A. 57:4, 2379-82 (Apr. 1998).

Jacobs, B.C. et al. Quantum cryptography in free space.. Optics Letters. 21:22, 1854-56 (Nov. 1996).

* cited by examiner

SYSTEMS AND METHODS FOR PATH SET-UP IN A QUANTUM KEY DISTRIBUTION NETWORK

RELATED APPLICATION

The present application relates to co-pending application Ser. No. 09/944,328, entitled "Quantum Cryptographic Key Distribution Networks with Untrusted Switches," filed on even date herewith and having assignee in common with that of the instant patent application. The disclosure of the co-pending application is incorporated by reference herein.

FIELD OF THE INVENTION

The present invention relates generally to cryptographic systems and, more particularly, to systems and methods for distributing encryption keys in quantum cryptographic networks.

BACKGROUND OF THE INVENTION

Conventional packet-switching networks permit cheap and reliable communications independent of the distance between a source node and a destination node in the network. These conventional networks often rely upon either public keys or shared private keys to provide privacy for messages that pass through the network's links. Public key cryptographic systems have the drawback that they have never been proven to be difficult to decipher. Therefore, it is possible that a method of efficiently cracking public key systems may one day be discovered. Such a discovery could make all public key technology obsolete. All supposedly "secure" networks based on public key technology would thus become vulnerable. Shared private keys also have the drawback that the logistics of distributing the private keys can be prohibitive.

Quantum cryptography represents a recent technological development that provides for the assured privacy of a communications link. Quantum cryptography is founded upon the laws of quantum physics and permits the detection of eavesdropping across a link. Quantum cryptographic techniques have been conventionally applied to distribute keys from a single photon source to a single photon detector, either through fiber optic strands or through the air. Although this approach is perfectly feasible for scientific experiments, it does not provide the kind of "anyone to anyone" connectivity that is provided by current communications technology. Conventional quantum cryptographic techniques require a direct connection to anyone with whom one wishes to exchange keying material. Obviously, a large system built along these lines would be impractical, since it would require every person to have enough sources and/or detectors, and fiber strands so that they could employ a dedicated set of equipment for each party with whom they intend to communicate.

Furthermore, conventional quantum cryptographic techniques fail to adequately handle the situations in which eavesdropping is present on a link or when a dedicated link fails (e.g., a fiber is accidentally cut). In conventional quantum cryptographic techniques, further key distribution across the dedicated link becomes impossible until eavesdropping on the link ceases or the link is repaired.

Therefore, there exists a need for systems and methods that can provide "any to any" connectivity while eliminating the need for a direct connection between parties distributing quantum key material, and which may further sustain key distribution even with link failure and/or when eavesdropping exists on the link.

SUMMARY OF THE INVENTION

Systems and methods consistent with the present invention address this and other needs by implementing a shared, switched network for quantum key distribution. The quantum key distribution (QKD) network of the present invention may include a single "public" network that can be shared across all parties who might desire to exchange keys, therefore, drastically reducing the cost and complexity of providing "any to any" connectivity. The quantum key distribution (QKD) network of the present invention may use quantum cryptographic techniques to assure the confidentiality of encryption keys distributed across a QKD path that may include multiple switches and links in a multi-node QKD network which, thus, may provide "any to any" connectivity for key distribution. With the confidentiality of the distributed encryption key(s) assured, the privacy of any data encrypted using the distributed encryption key(s) is further assured. A host can thus send encrypted data in a network consistent with the present invention and be assured of the security of the data received at a destination host. The QKD network of the present invention may further detect eavesdropping on the QKD path and may route the distribution of encryption keys around the eavesdropping in the network. The QKD network of the present invention may, additionally, discover the location of an eavesdropper at a switch and/or link along the QKD path.

In accordance with the purpose of the invention as embodied and broadly described herein, a method of establishing a path for distributing data through a network includes establishing a first data distribution path through the network, the network comprising at least one switch and one link; determining whether eavesdropping has occurred on the first data distribution path using quantum cryptography; and establishing a second data distribution path through the network based on the eavesdropping determination.

In another implementation consistent with the present invention, a method of constructing a path through a multi-node communications network includes requesting a path through the network, the request comprising identifiers of at least one of a link and a node in the network, and setting up the path through the network, the path excluding the at least one of the link and the node in the network.

In a further implementation consistent with the present invention, a method of locating an eavesdropper eavesdropping photons transmitted in an optical network includes transmitting photons across a first path in the optical network, the first path comprising a plurality of links and nodes; and identifying a location of an eavesdropper of the transmitted photons by successively omitting each link and node from the first path and determining an occurrence of eavesdropping at each omission using quantum cryptography.

In an additional implementation consistent with the present invention, a method of routing around eavesdroppers in a network includes establishing a first path in the network, transmitting data symbols over the first path, identifying eavesdropping on the first path using quantum cryptography, establishing a second path in the optical network responsive to the eavesdropping identification, and transmitting data symbols over the second path.

In a further implementation consistent with the present invention, a method of establishing a path for distributing encryption key material through an optical network that includes links interconnecting optical switches includes establishing a first key distribution path through a first series of links and optical switches of the optical network.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide mechanisms for distributing encryption keys, using quantum cryptographic techniques, across multiple switches and links in a multi-node quantum key distribution network. Systems and methods consistent with the present invention further provide mechanisms for detecting eavesdropping on the quantum key distribution path and for routing the distribution of encryption keys around the eavesdropping in the network. Systems and methods consistent with the present invention may also discover the location of an eavesdropper at a QKD switch and/or link along the QKD path in the QKD network.

Exemplary Network

Figure 1:
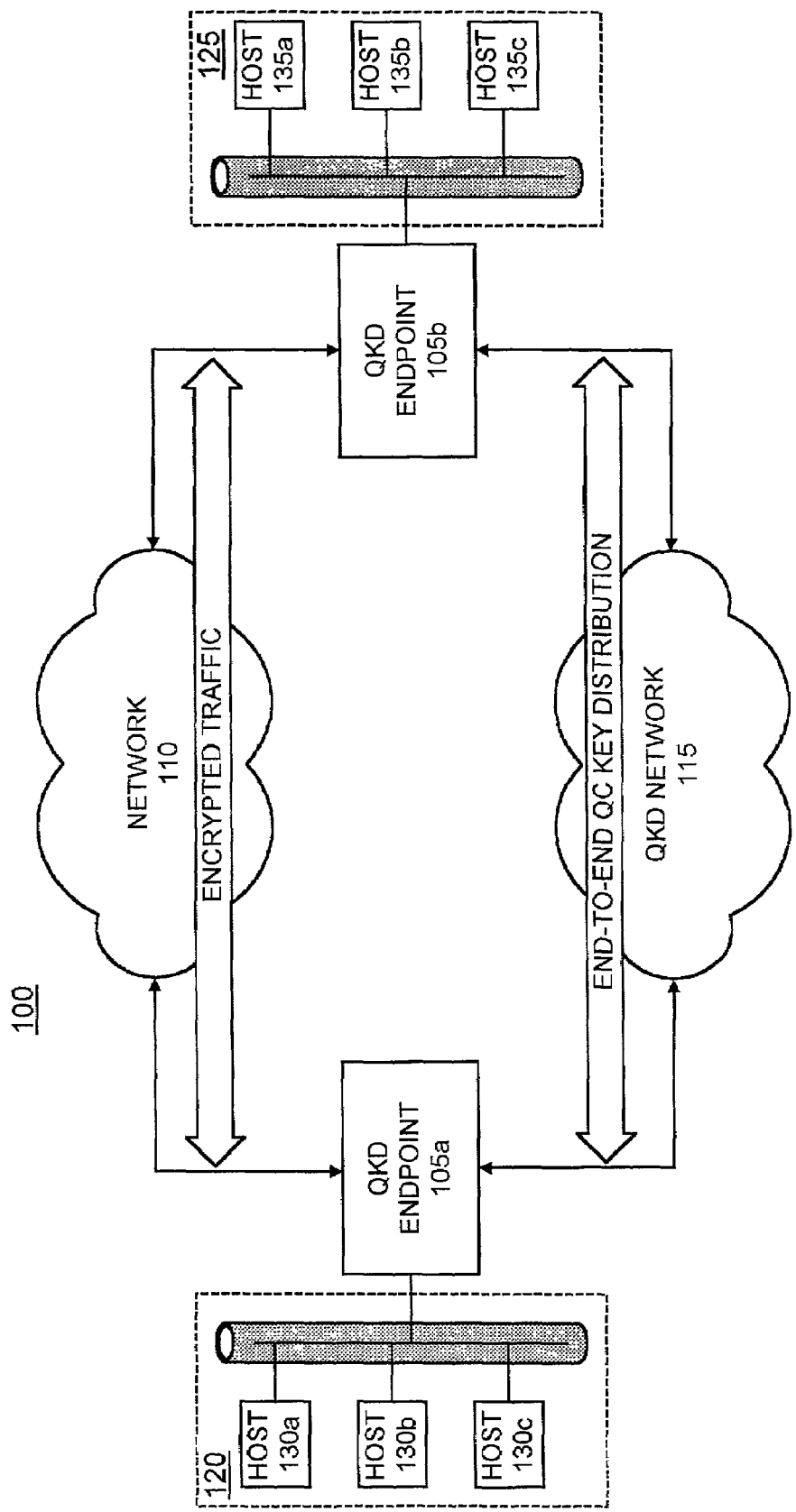
FIG. 1 illustrates an exemplary network in which systems and methods, consistent with the present invention, may be implemented.

FIG. 1 illustrates an exemplary network 100 in which systems and methods distribute encryption keys via quantum cryptographic mechanisms consistent with the present invention. Network 100 may include QKD endpoints 105a and 105b connected via sub-network 110 and QKD sub-network 115. QKD endpoints 105a and 105b may each include a host or a server. QKD endpoints 105a and 105b that include servers may further connect to local area networks (LANs) 120 or 125. LANs 120 and 125 may further connect with hosts 130a–130c and 135a–135c, respectively. Sub-network 110 can include one or more networks of any type, including a local area network (LAN), metropolitan area network (MAN), wide area network (WAN), Internet, or Intranet.

QKD sub-network 115 may include one or more QKD switches (not shown) for distributing encryption keys between a source QKD endpoint (e.g., QKD endpoint 105a) and a destination QKD endpoint (e.g., QKD endpoint 105b). The QKD switches of QKD sub-network 115 may be trusted or untrusted switches. Trusted QKD switches include QKD switches that consist of a known level of security. Untrusted QKD switches include QKD switches that are either unsecure, or are of an unverifiable level of security.

Subsequent to quantum key distribution via QKD network 115, QKD endpoint 105a and QKD endpoint 105b may encrypt traffic using the distributed key(s) and transmit the traffic via sub-network 110.

Exemplary QKD Network

Figure 2:
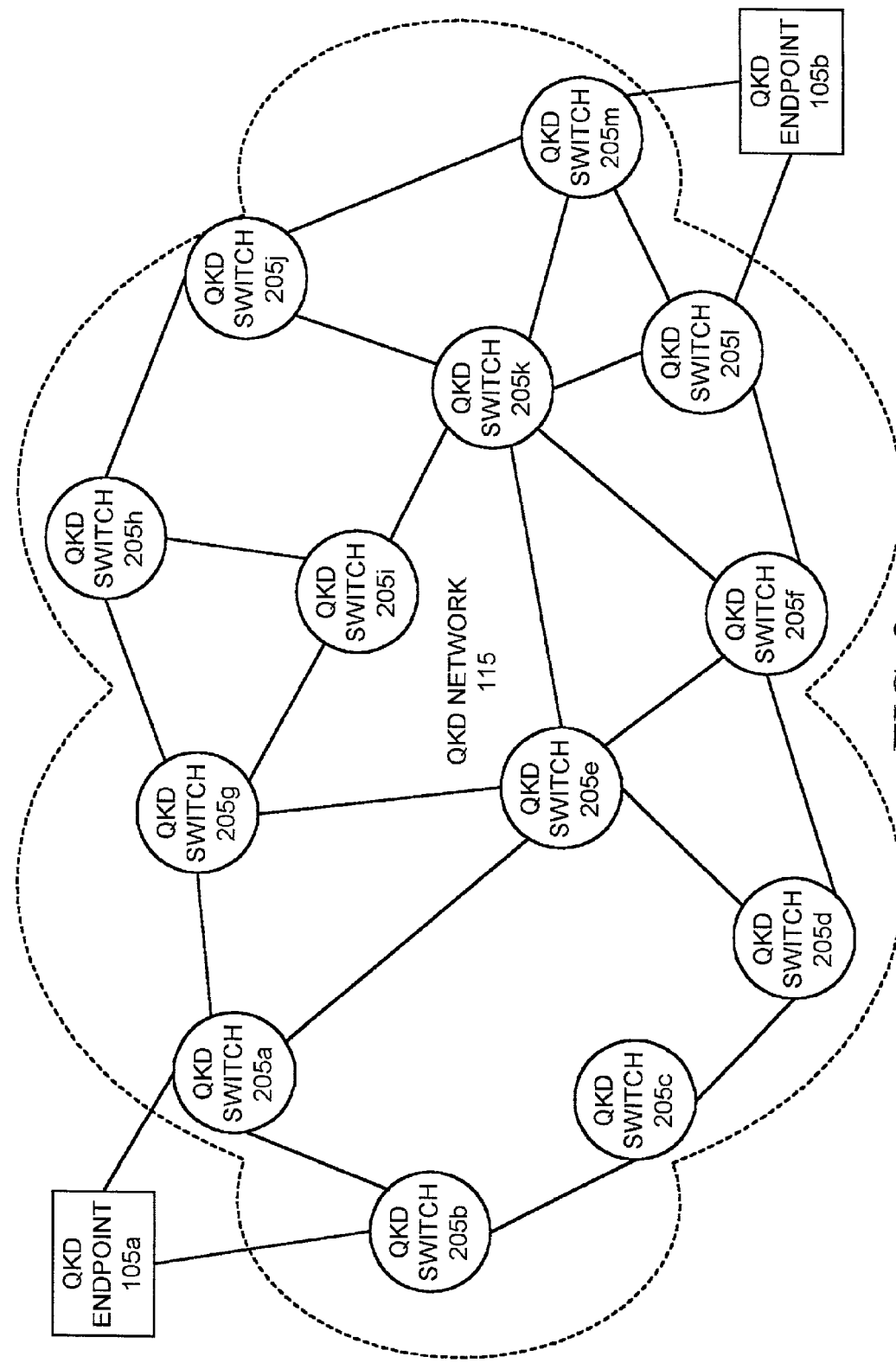
FIG. 2 illustrates exemplary components of the quantum key distribution (QKD) network of FIG. 1 consistent with the present invention.

FIG. 2 illustrates an exemplary diagram, consistent with the present invention, of QKD sub-network 115. QKD sub-network 115 may include one or more QKD switches 205a–205m interconnected via one or more links that may carry light throughout the electromagnetic spectrum, including light in the human visible spectrum and light beyond the human-visible spectrum, such as, for example, infrared or ultraviolet light. The interconnecting links may include, for example, conventional optical fibers. Alternatively, the interconnecting links may include free-space optical paths, such as, for example, through the atmosphere or outer space, or even through water or other transparent media. As another alternative, the interconnecting links may include hollow optical fibers that may be lined with photonic band-gap material. As shown in FIG. 2, QKD endpoints 105a and 105b may each connect with one or more QKD switches of QKD sub-network 115.

Exemplary QKD Endpoint

Figure 3A:
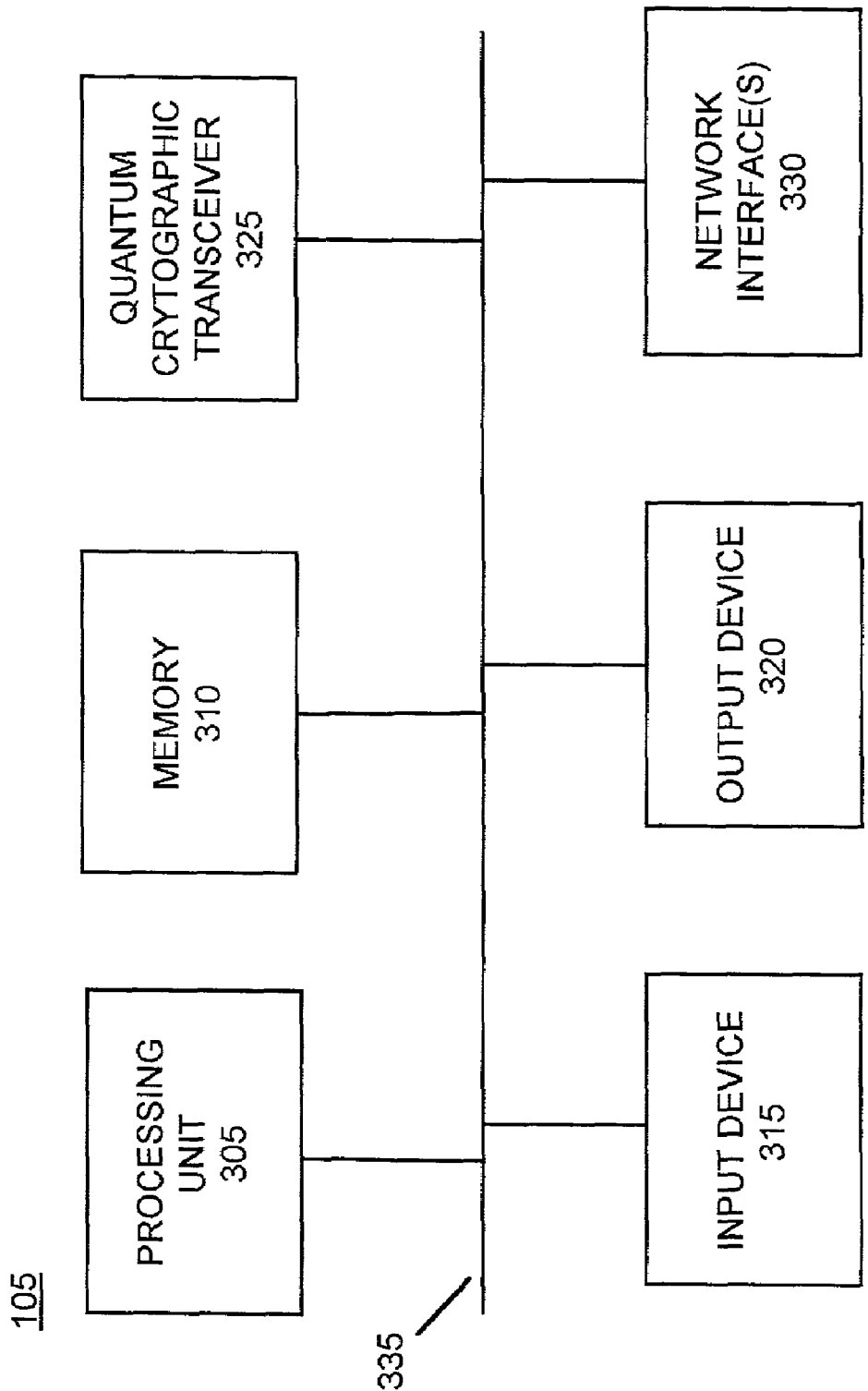
FIG. 3A illustrates an exemplary configuration of a QKD endpoint consistent with the present invention.

FIG. 3A illustrates exemplary components of a QKD endpoint 105 consistent with the present invention. QKD endpoint 105 may include a processing unit 305, a memory 310, an input device 315, an output device 320, a quantum cryptographic transceiver 325, a network interface(s) 330 and a bus 335. Processing unit 305 may perform all data processing functions for inputting, outputting, and processing of QKD endpoint data. Memory 310 may include Random Access Memory (RAM) that provides temporary working storage of data and instructions for use by processing unit 305 in performing processing functions. Memory 310 may additionally include Read Only Memory (ROM) that provides permanent or semi-permanent storage of data and instructions for use by processing unit 305. Memory 310 can also include large-capacity storage devices, such as a magnetic and/or optical recording medium and its corresponding drive.

Input device 315 permits entry of data into QKD endpoint 105 and may include a user interface (not shown). Output device 320 permits the output of data in video, audio, or hard copy format. Quantum cryptographic transceiver 325 may include conventional mechanisms for transmitting and receiving encryption keys using quantum cryptographic techniques.

Figure 3B:
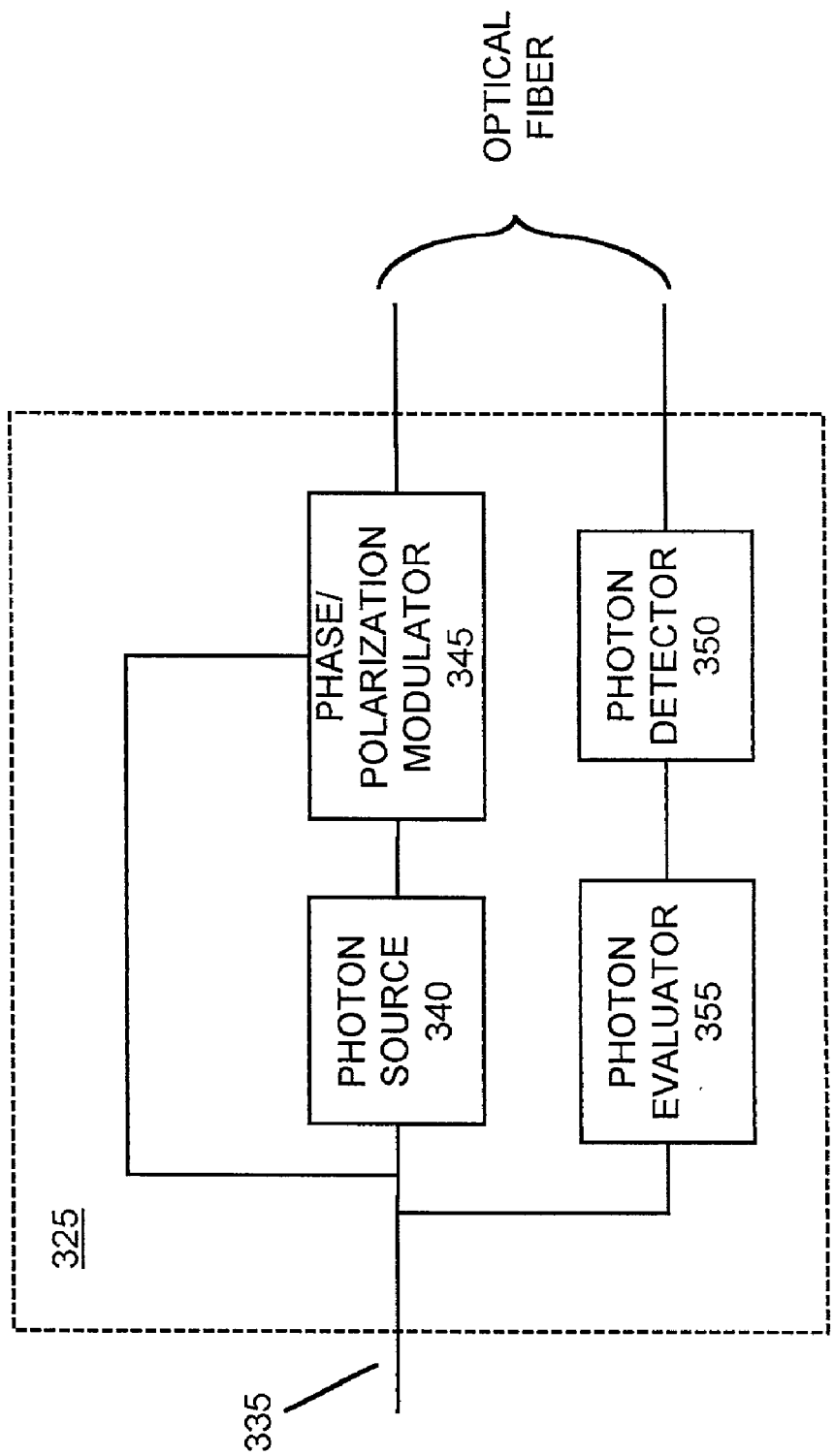
FIG. 3B illustrates exemplary components of the quantum cryptographic transceiver of FIG. 3A consistent with the present invention.

FIG. 3B illustrates exemplary components of quantum cryptographic transceiver 325. Quantum cryptographic transceiver 325 may include a photon source 340, a phase/polarization modulator 345, a photon detector 350, and a photon evaluator 355. Photon source 340 can include, for example, a conventional laser. Photon source 340 may produce photons according to instructions provided by processing unit 305. Photon source 340 may produce photons of light with wavelengths throughout the electromagnetic spectrum, including light in the human visible spectrum and light beyond the human-visible spectrum, such as, for example, infrared or ultraviolet light.

Phase/polarization modulator 345 can include, for example, conventional Mach-Zehnder interferometers. Phase/polarization modulator 345 encodes outgoing photons from the photon source according to commands received from processing unit 305 for transmission across an optical link. Photon detector 350 can include, for example, conventional avalanche photo detectors (APDs) or conventional photo-multiplier tubes (PMTs). Photon detector 350 can detect photons received across the optical link. Photon evaluator 355 can include conventional circuitry for processing and evaluating output signals from photon detector 350 in accordance with conventional quantum cryptographic techniques.

Returning to FIG. 3A, network interface(s) 330 may interconnect QKD endpoint 105 with sub-network 115. Bus 335 interconnects the various components of QKD endpoint 105a to permit the components to communicate with one another.

Exemplary QKD Switch

Figure 4:
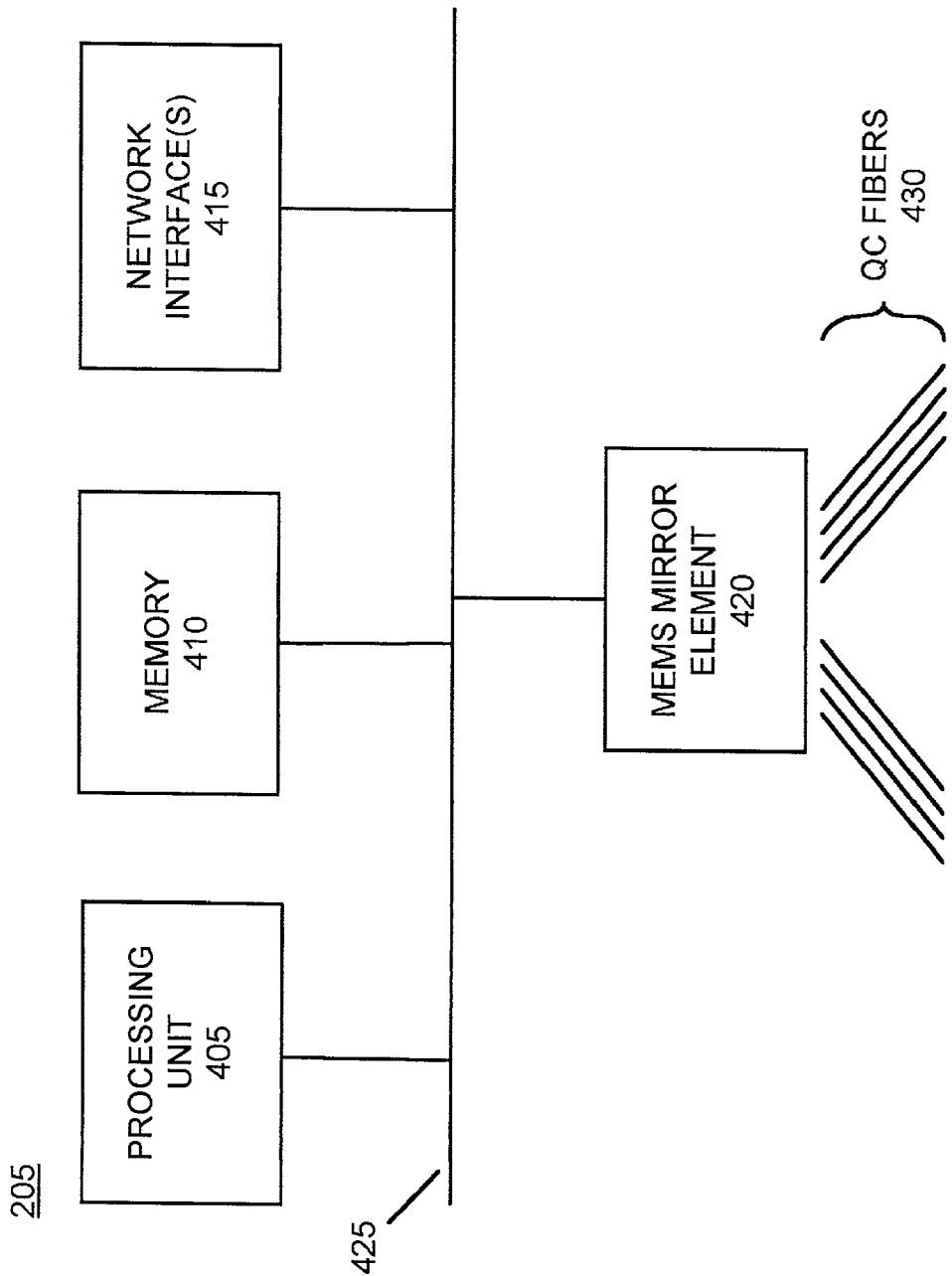
FIG. 4 illustrates an exemplary configuration of an untrusted QKD switch consistent with the present invention.

FIG. 4 illustrates exemplary components of a QKD switch 205 consistent with the present invention. QKD switch 205 may include a processing unit 405, a memory 410, a network interface(s) 415, a Micro-Electro-Mechanical Systems (MEMS) mirror element 420, and a bus 425. MEMS mirror element 420 may be interconnected with one or more links that may include quantum cryptographic (QC) fibers 430.

Processing unit 405 may perform all data processing functions for inputting, outputting, and processing of QKD switch data. Memory 410 may include Random Access Memory (RAM) that provides temporary working storage of data and instructions for use by processing unit 405 in performing processing functions. Memory 410 may additionally include Read Only Memory (ROM) that provides permanent or semi-permanent storage of data and instructions for use by processing unit 405. Memory 410 can also include large-capacity storage devices, such as a magnetic and/or optical recording medium and its corresponding drive.

Network interface(s) 415 interconnects QKD switch 205 with sub-network 110. MEMS mirror element 420 may include an array of optical switching mirrors such as, for example, any of those disclosed in U.S. Pat. Nos. 5,960,133, 5,960,131, 6,005,993, 6,154,586, and 5,911,018, all of which are incorporated by reference herein. MEMS mirror element 420 directs photons, containing quantum encryption keys encoded via phase and/or polarization states, through a path along a fiber of QC fibers 430 in QKD sub-network 115 according to instructions from processing unit 405. Bus 425 interconnects the various components of QKD switch 205 to permit the components to communicate with one another. QC fibers 430 may include one or more optical fibers.

Exemplary Quantum Key Distribution

Figure 5:
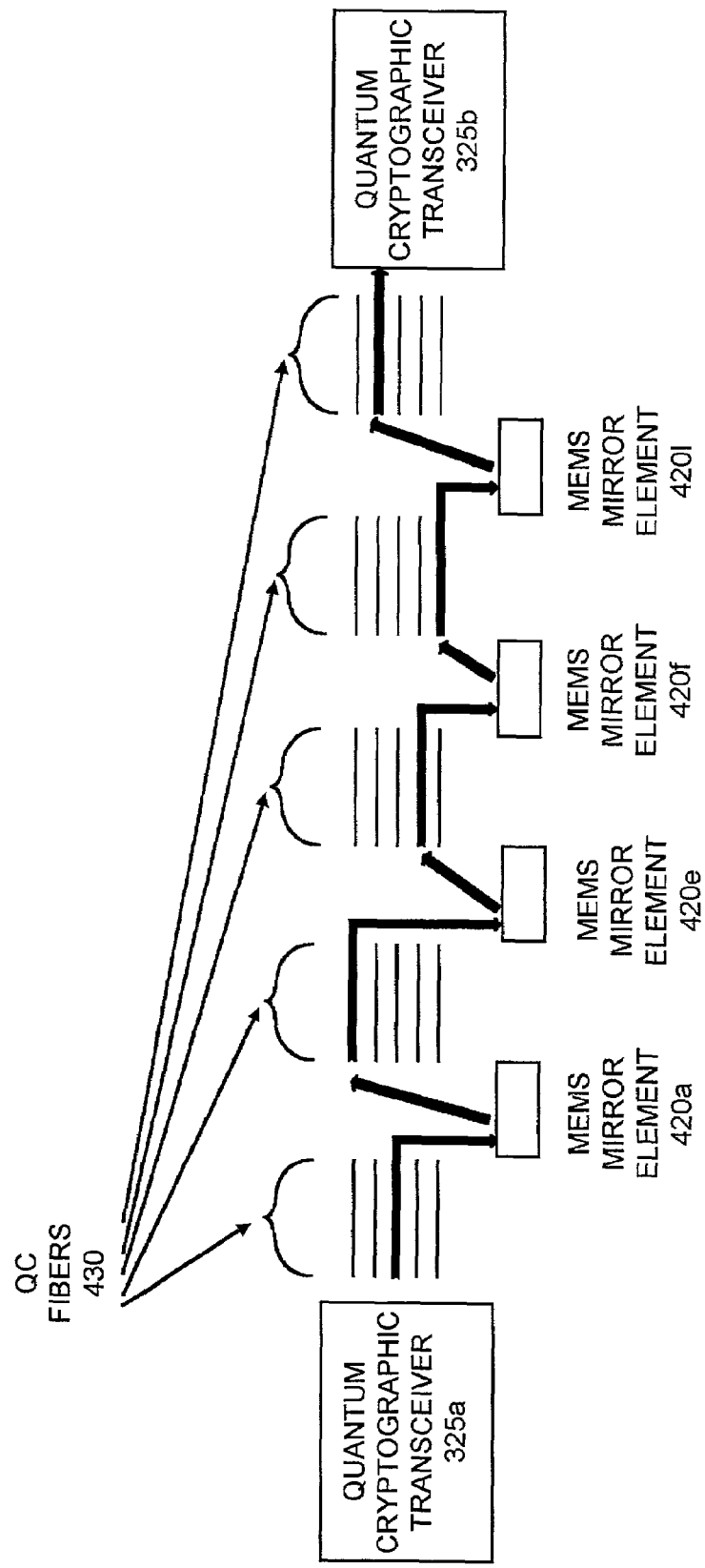
FIG. 5 illustrates an exemplary quantum key distribution process consistent with the present invention.

FIG. 5 illustrates exemplary quantum key distribution from QKD endpoint 105a to QKD endpoint 105b, via QKD sub-network 115 using QKD switch 205 MEMS mirror elements 420, consistent with the present invention. To distribute an encryption key, quantum cryptographic transceiver 325a at QKD endpoint 105a transmits photons through a path along QC fiber links interconnecting, for example, QKD switches 205a, 205e, 205f and 205l and quantum cryptographic transceiver 325b at QKD endpoint 105b. At each QKD switch 205, a MEMS mirror element 420 directs the incoming photon to an appropriate outbound QC fiber link in accordance with techniques disclosed in the aforementioned and related co-pending application Ser. No. 09/944,328, entitled "Quantum Cryptographic Key Distribution Networks with Untrusted Switches."

Exemplary Link State Processing

Figure 6:
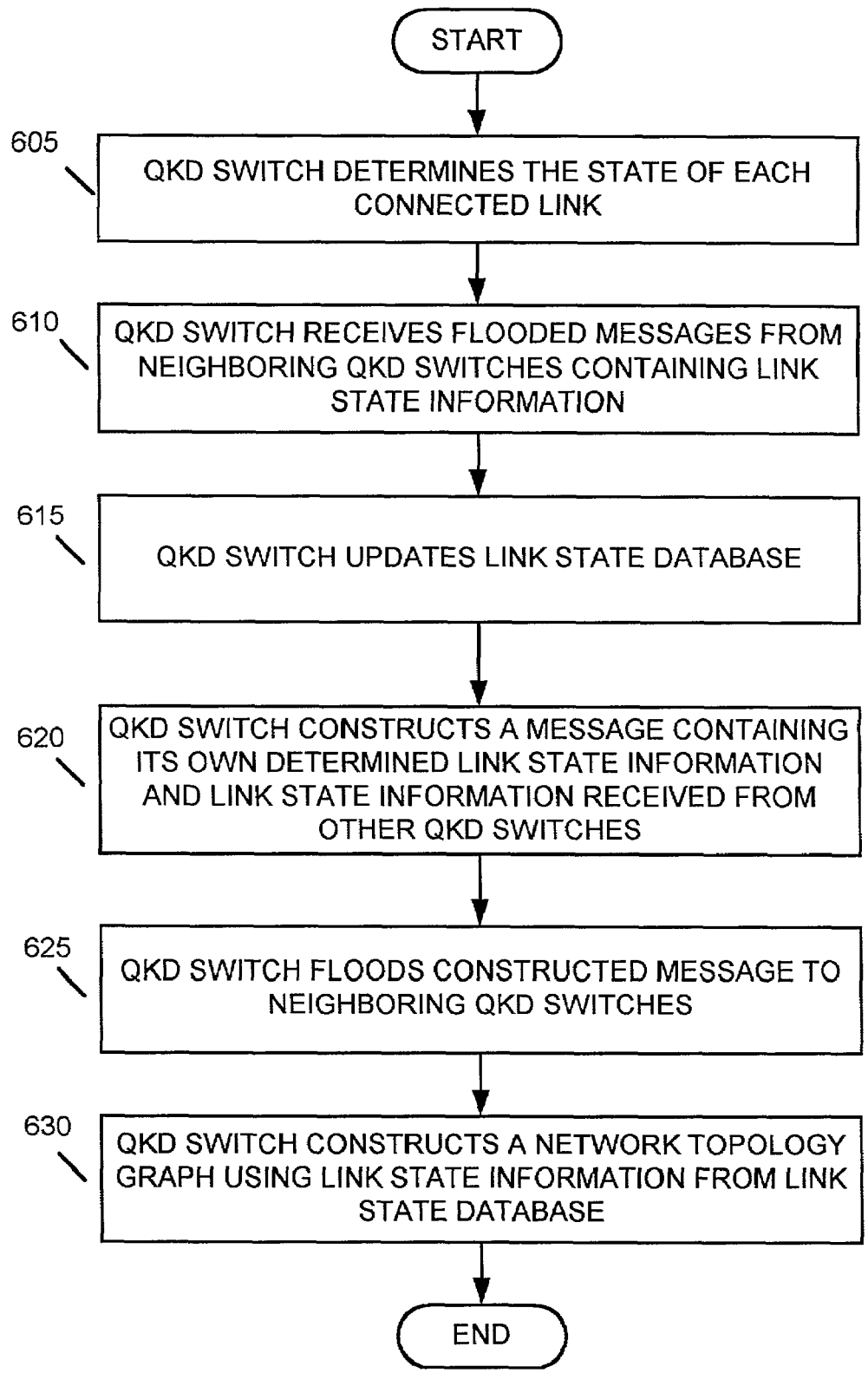
FIG. 6 is a flow chart that illustrates exemplary system processing for constructing a network graph using flooded link state information consistent with the present invention.

FIG. 6 is a flowchart that illustrates exemplary processing, consistent with the present invention, for constructing a network topology graph using network link state information. As one skilled in the art will appreciate, the method exemplified by FIG. 6 can be implemented as a sequence of instructions and stored in memory 410 of QKD switch 205 for execution by processing unit 405.

Processing may begin with a QKD switch 205 determining the state of each link connected to the switch [step 605]. For example, QKD switch 205 may determine the free fibers, optical wavelengths, and/or Time Division Multiple Access (TDMA) time slots that are available on connected links. QKD switch 205 may further receive flooded messages from neighboring QKD switches containing link state information [step 610]. Using the determined, and flooded, link state information, QKD switch 205 may update a link state database stored in memory 410 to incorporate the link state information [step 615]. QKD switch 205 may further construct a message containing its own determined link state information and link state information received from other QKD switches in sub-network 115 [step 620].

QKD switch 205 may flood the constructed message to neighboring QKD switches [step 625]. QKD switch 205 may construct a network topology graph using the link state information stored in the link state database [step 630]. For example, QKD switch 205 may construct a complete network topology graph that includes all links in QKD sub-network 115. Additionally, QKD switch 205 may construct a hierarchical network topology graph that may include abstracted information about the general availability of linkages within one or more regions, rather than highly specific information about the current availability of individual fiber links and/or timeslots. As an example, such abstracted information might indicate that there is currently sufficient capacity available between Boston and New York to transport several million bits/second of key material, without providing the full detail of exactly how many fibers are available or the detailed information about how many bits per second are being utilized on each of these fibers. Such systems may provide multiple levels of abstraction, e.g., so that metro capacity may be incorporated into a higher level of "regional" capacity abstraction, which in turn may be incorporated into a yet higher level of "national" capacity abstraction, and so forth.

Exemplary QKD Path Setup Processing

Figure 7:
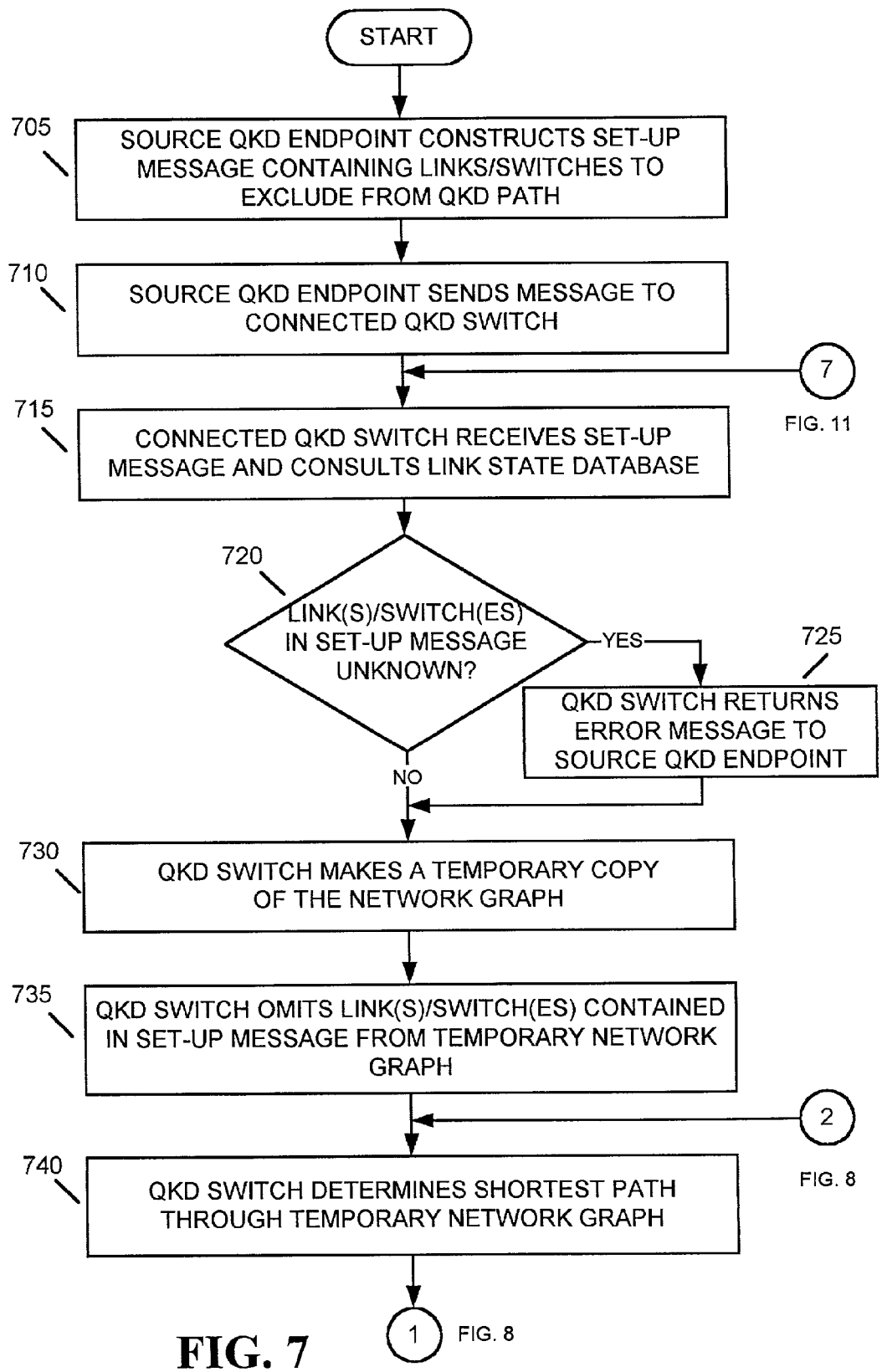
FIGS. 7–8 are flow charts that illustrate exemplary system processing for setting up a QKD path through the QKD network.
Figure 8:
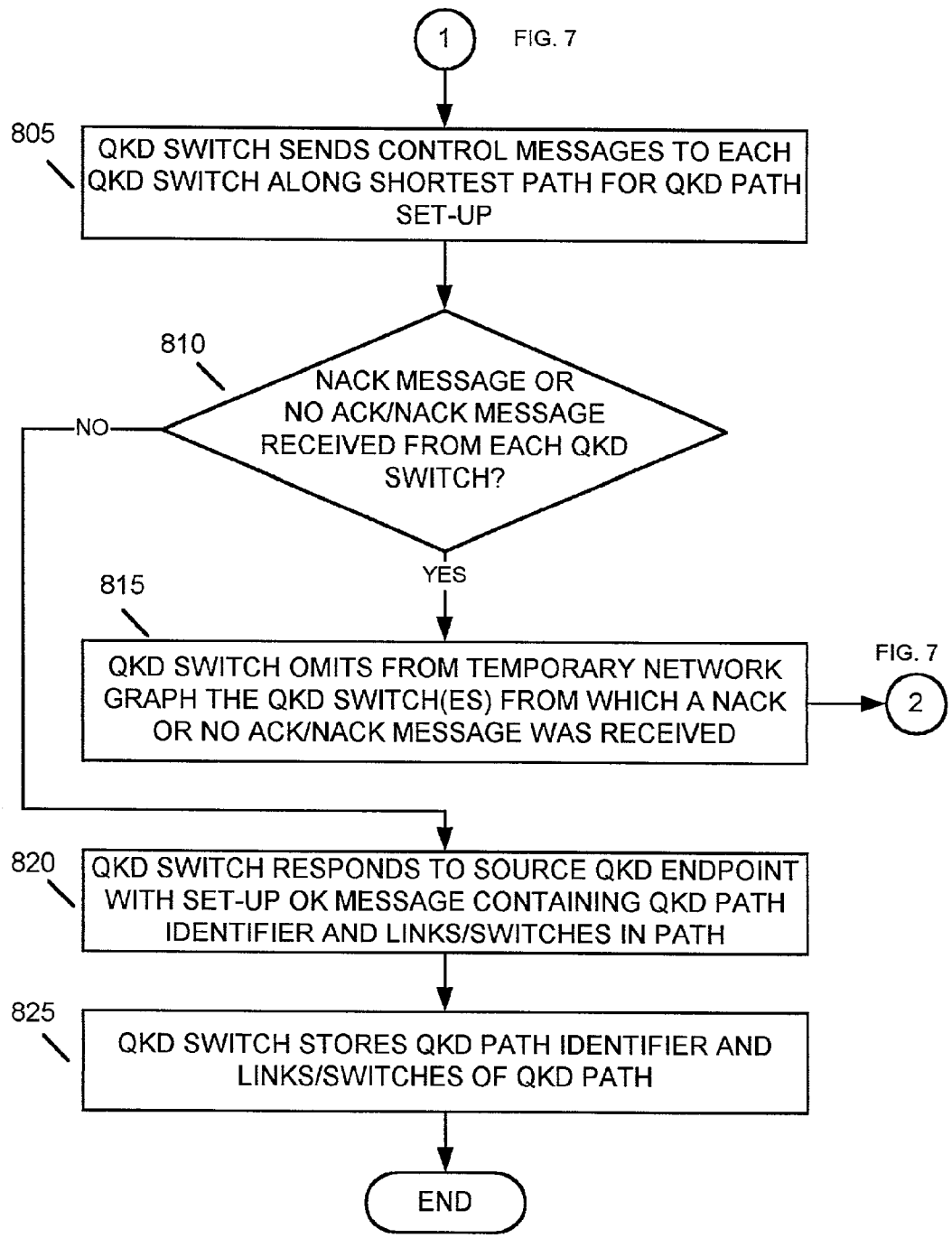

FIGS. 7–8 are flowcharts that illustrate exemplary processing, consistent with the present invention, for setting up a QKD path from, for example, a source QKD endpoint 105a to a destination QKD endpoint 105b. The method exemplified by FIGS. 7–8 can be implemented, as appropriate, as a sequence of instructions and stored in either memory 410 or memory 310 for execution by processing unit 405 or processing unit 305, respectively.

To begin processing, source QKD endpoint 105a may construct a set-up message containing any links or switches in network 115 that are to be excluded from the QKD path [step 705]. Source QKD endpoint 105a may then send the message to a connected QKD switch, such as, for example, QKD switch 205a [step 710]. QKD switch 205a may receive the set-up message and consult its own link state database stored in memory 410 [step 715]. From its own link state database, QKD switch 205a may determine if the links(s) and/or switch(es) identified in the set-up message are unknown [step 720]. If so, QKD switch 205a returns an error message to source QKD endpoint 105a that indicates that a link(s) and/or switch(es) identified in the set-up message are not found in QKD switch 205a's link state database [step 725]. If not, QKD switch 205a may make a temporary copy of the network topology graph [step 730]. QKD switch 205a may then omit the link(s)/switch(es) contained in the set-up message from the temporary network topology graph [step 735].

QKD switch 205a may determine a shortest path through the temporary network topology graph [step 740]. QKD switch 205a may employ any conventional shortest path determination algorithm, such as, for example, the Shortest Path First algorithm. QKD switch 205a may further send control messages, via sub-network 110, to each QKD switch along the determined shortest path for QKD path set-up [step 805] (FIG. 8). Responsive to the received control messages, each QKD switch 205a may adjust its MEMS mirror element 420 to direct photons received from QKD endpoint 205a to the appropriate next QKD switch 205 in the QKD path. QKD switch 205a may then determine if a negative acknowledge (NACK) message, or if no NACK or acknowledgement (ACK) message, is received from each QKD switch [step 810]. If so, QKD switch 205a may omit the QKD switch(es) from which either a NACK message, or no ACK/NACK message, was received, from the temporary network topology graph [step 815] and may return to step 740 of FIG. 7.

If an ACK message is received from each QKD switch, QKD switch 205a may respond to source QKD endpoint 105a with a set-up OK message that may contain a QKD path identifier that identifies the set-up QKD path and the links/switches in the set-up QKD path [step 820]. QKD switch 205a may further store the QKD path identifier and links/switches of the QKD path in memory 410 [step 825].

Exemplary QKD Eavesdropping Location Identification Processing

FIGS. 9–14 are flowcharts that illustrate exemplary processing, consistent with the present invention, for identification of eavesdropping on the quantum channel, QKD path teardown and eavesdropper location identification. As one skilled in the art will appreciate, the method exemplified by FIGS. 9–14 can be implemented, as appropriate, as a sequence of instructions and stored in either memory 410 or memory 310 for execution by processing unit 405 or processing unit 305, respectively.

To begin processing, source QKD endpoint 105a may implement quantum key distribution with destination QKD endpoint 105b using conventional quantum cryptographic techniques [step 905]. For example, QKD endpoint 105a may employ conventional photon state discussion, sifting, and privacy amplification techniques. Source QKD endpoint 105a may further detect if there is eavesdropping on the QKD path in accordance with conventional quantum cryptographic eavesdropper estimation techniques [step 910]. If no eavesdropping exists, source QKD endpoint 105a may determine if quantum key distribution is complete [step 915]. If not, processing returns to step 905. If QKD is complete, source QKD endpoint 105a may send a QKD path teardown message to a connected QKD switch (e.g., QKD switch 205a) [step 920]. The connected QKD switch 205 receives the teardown message [step 925] and sends control messages to all other switches in the QKD path for path teardown [step 930]. Subsequent to receipt of responses from the QKD switches in the QKD path, QKD switch 205 replies to source QKD endpoint 105a with a teardown OK message indicating that the QKD path at each QKD switch has been torn down [step 935].

Figure 11:
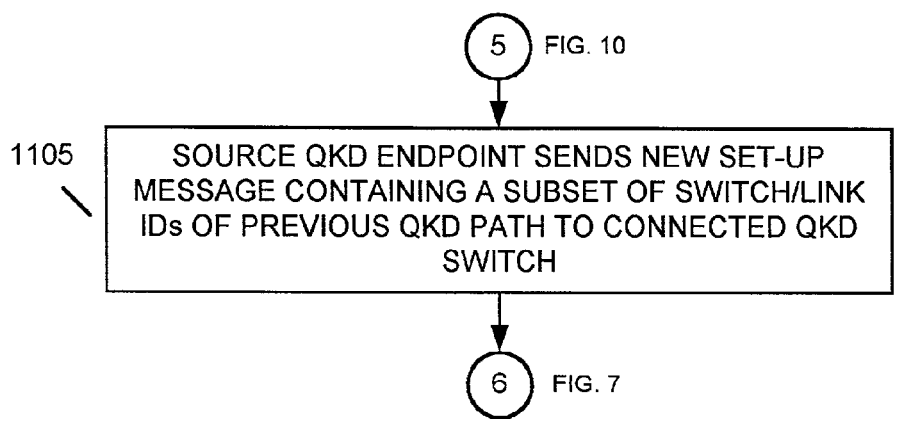
Figure 12:
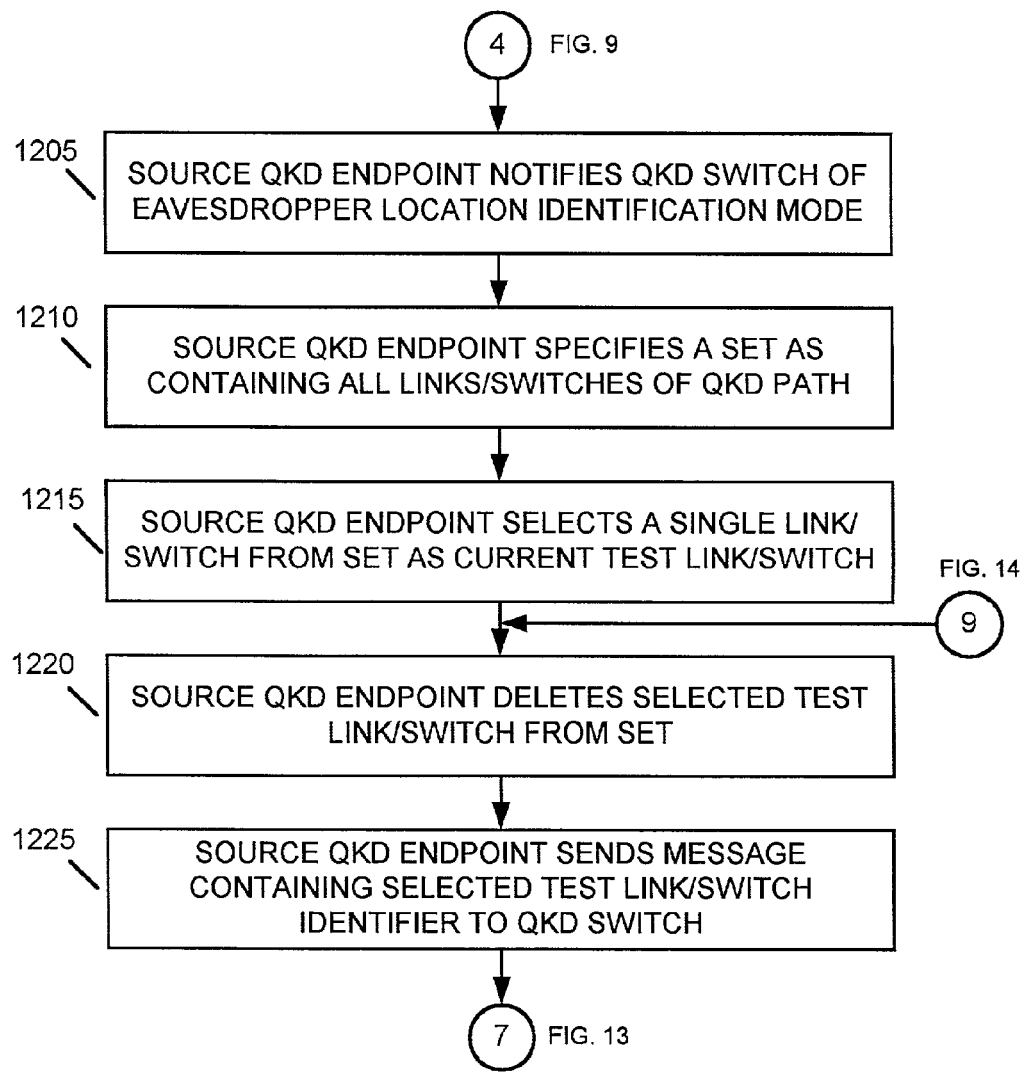
Figure 13:
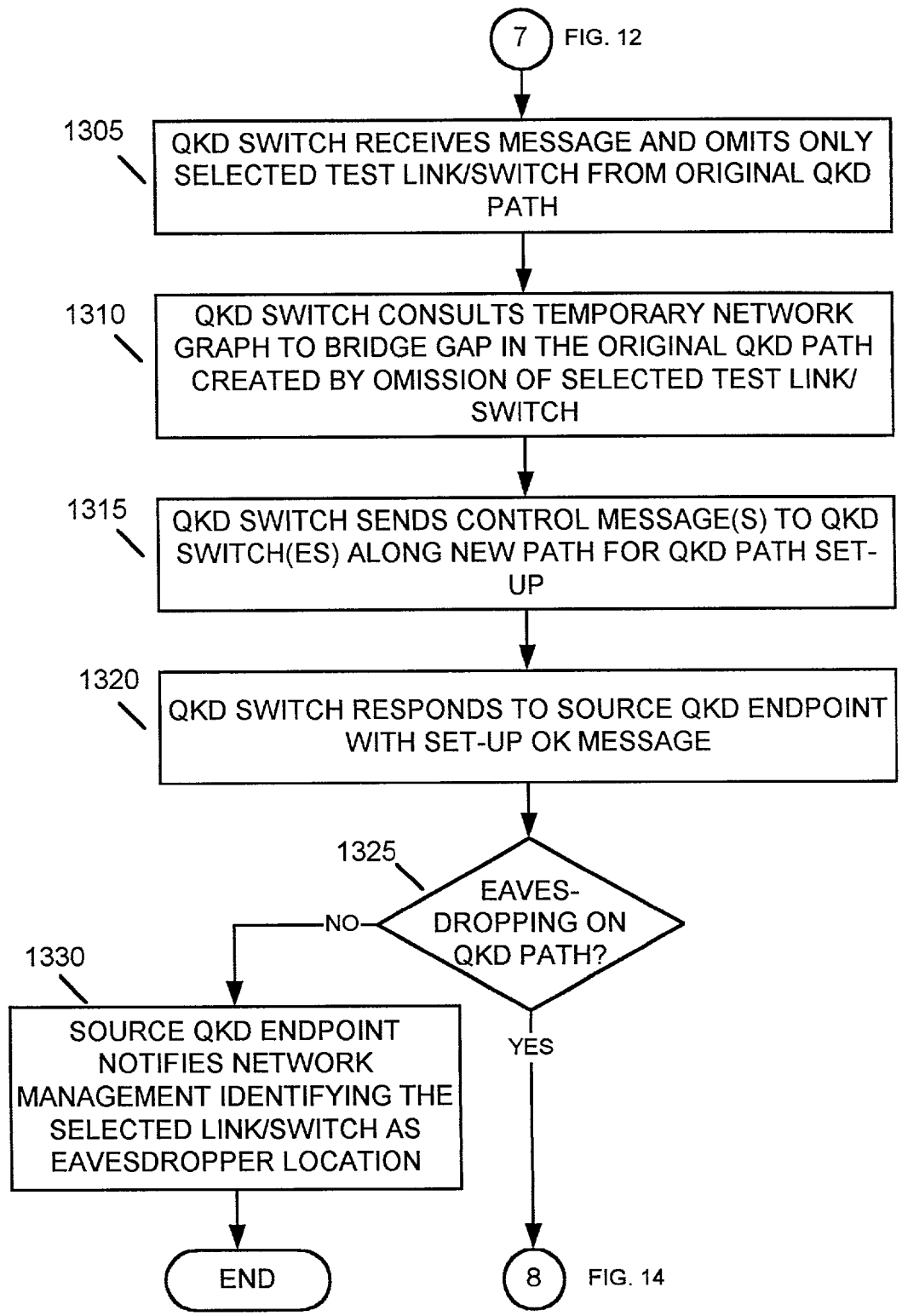

Returning to step 910, if source QKD endpoint 105a detects eavesdropping on the QKD path, source QKD endpoint 105a may send a QKD path teardown message containing the QKD path identifier to the connected QKD switch 205 [step 1005]. The connected QKD switch 205 receives the teardown message [step 1010] and sends control messages to all other switches in the existing QKD path for path teardown [step 1015]. The connected QKD switch 205 replies with a teardown OK message to source QKD endpoint 105a when responses are received from the QKD switches in the QKD path [step 1020]. Source QKD endpoint 105a may send a new set-up message containing all switch/link identifiers of the previous QKD path to the connected QKD switch 205 [step 1025]. Alternatively, as suggested by the dashed arrow to tab "5", source QKD endpoint 105a may send a new set-up message containing a subset of switch/link identifiers of switches/links in the previous QKD path to the connected QKD switch 205 [step 1105] (FIG. 11). For example, source QKD endpoint 105a may trust certain of the links and/or switches in the QKD path and may, thus, exclude these trusted links/switches from the switch/link identifiers that are sent in the new set-up message.

Figure 9:
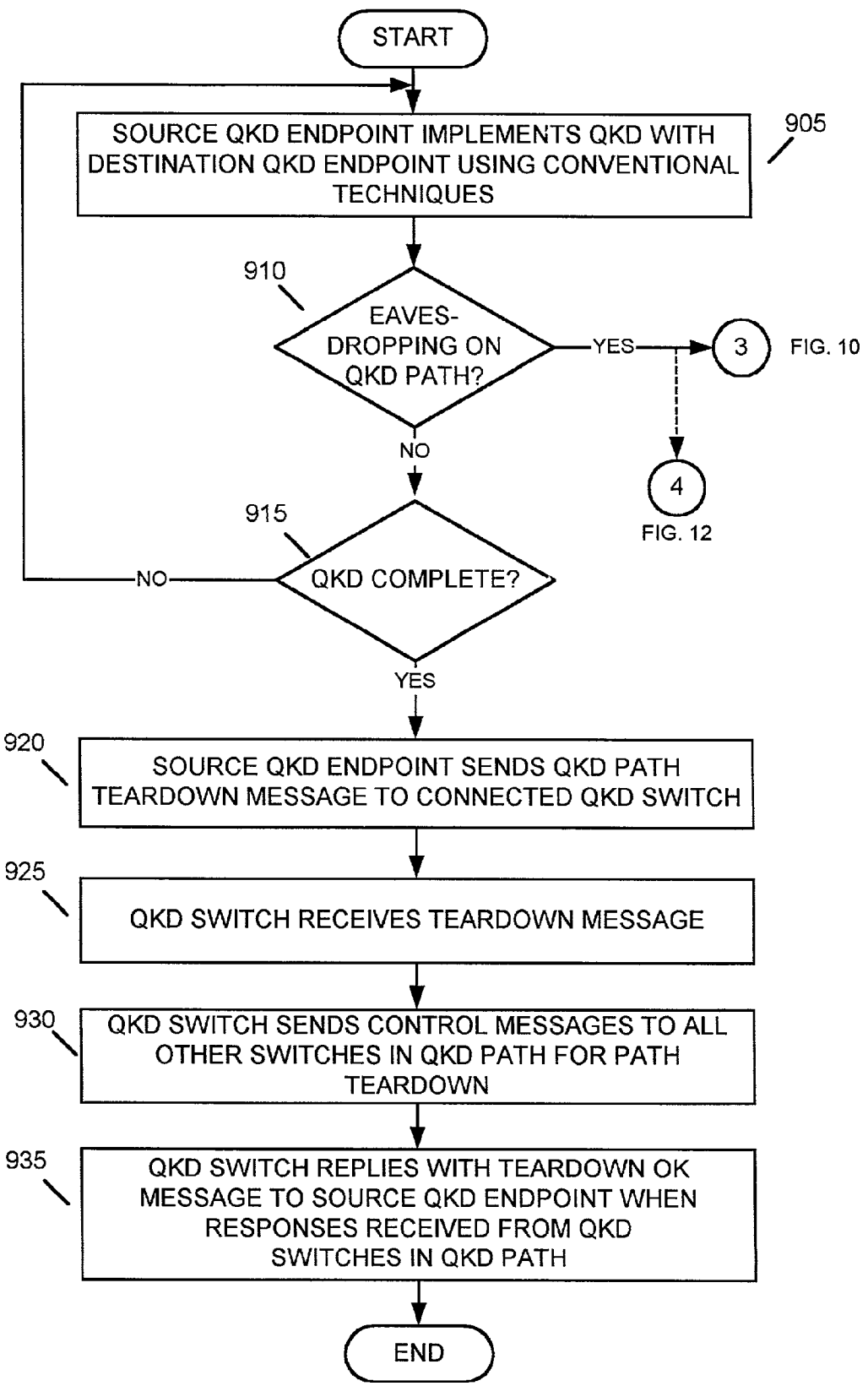
FIGS. 9–14 are flow charts that illustrate exemplary system processing for eavesdropping identification, QKD path teardown and eavesdropper location identification consistent with the present invention.
Figure 10:
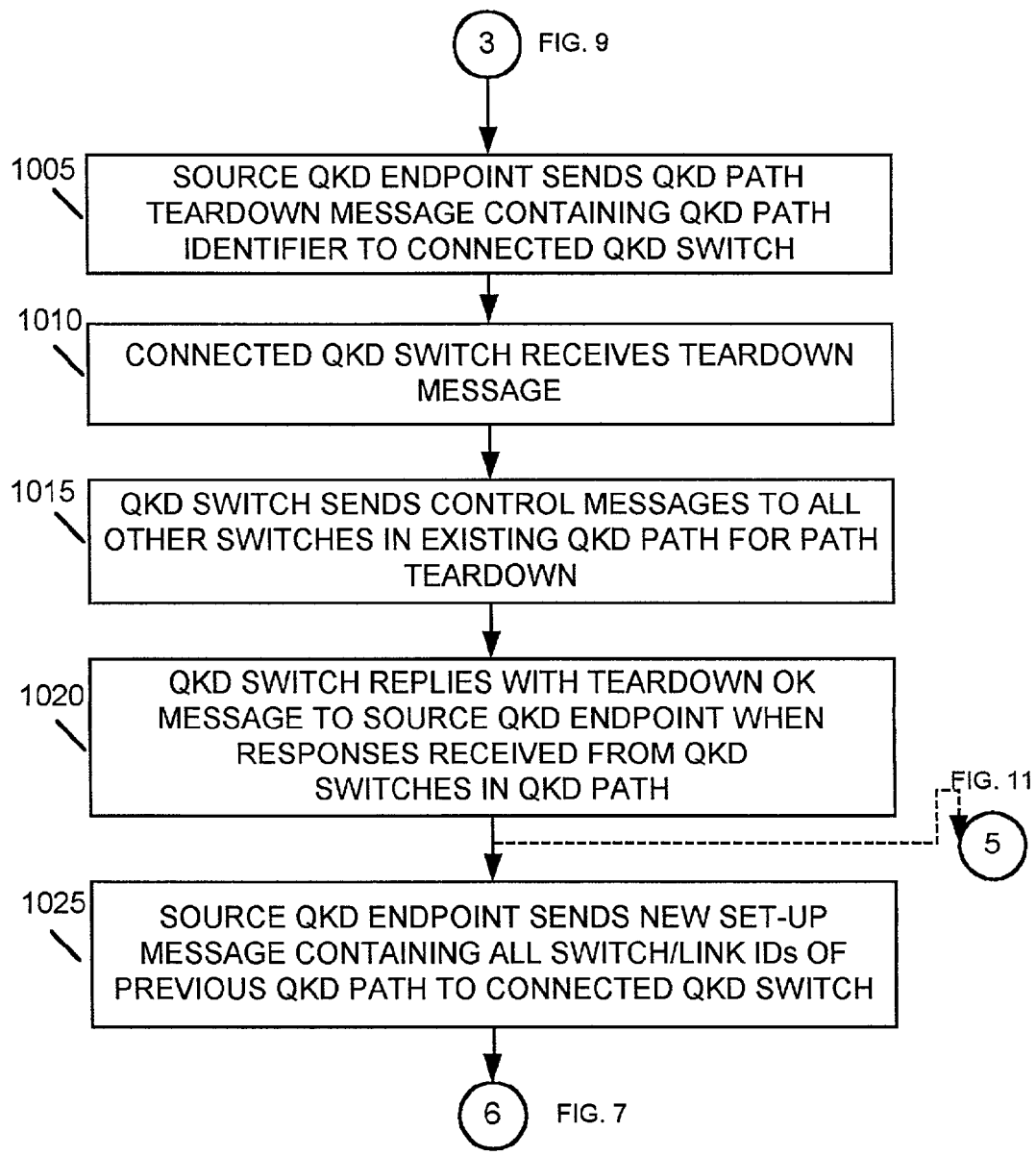

Returning again to step 910 of FIG. 9, if source QKD endpoint 105a detects eavesdropping on the QKD path, source QKD endpoint 105a may, alternatively, as suggested by dashed arrow to tab "4", initiate an eavesdropper location identification mode by notifying the connected QKD switch [step 1205]. Source QKD endpoint 105a may specify a set {S} as containing all of the links and switches of the original QKD path [step 1210]. Source QKD endpoint 105a may select a single link or switch from set {S} as a current link/switch to test for eavesdropping [step 1215]. Source QKD endpoint 105a may delete the selected test link/switch from set {S} [step 1220]. Source QKD endpoint 105a may then send a message containing the selected test link/switch identifier to the connected QKD switch 205 [step 1225].

The connected QKD switch 205 may receive the message and may omit only the selected test link/switch from the original QKD path [step 1305]. QKD switch 205 consults the temporary network graph to find link(s)/switch(es) to bridge the gap in the original QKD path created by the omission of the selected test link/switch [step 1310]. QKD switch 205 may send a control message(s) to QKD switch (es) along the temporary new path for QKD path set-up [step 1315]. QKD switch may respond to source QKD endpoint 105a with a set-up OK message [step 1320].

Figure 14:
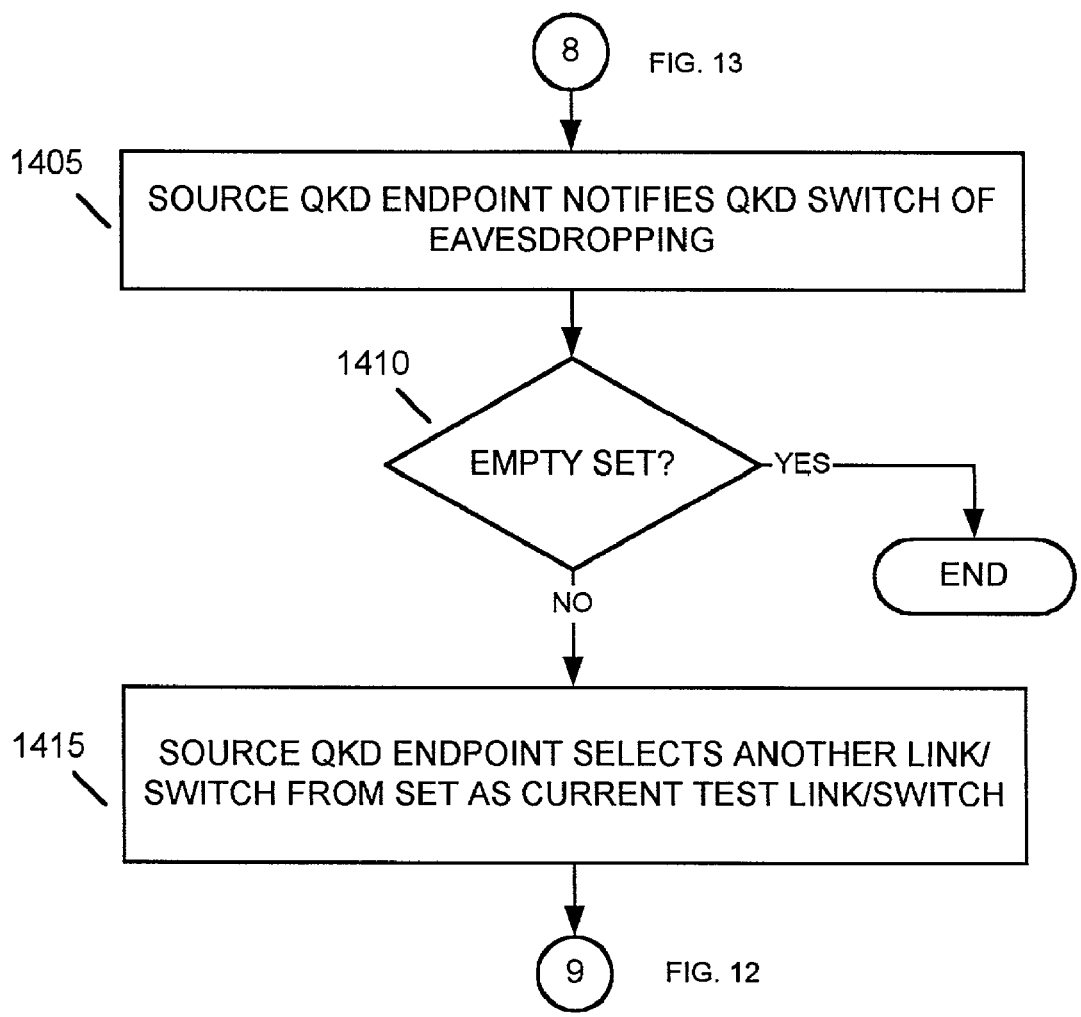

Source QKD endpoint 105a may then detect whether eavesdropping has occurred on the temporary QKD path [step 1325]. If not, source QKD endpoint 105a may notify a network management entity of the eavesdropping, identifying the selected link/switch as the eavesdropper location [step 1330]. If eavesdropping is detected, however, source QKD endpoint 105a may notify the connected QKD switch of eavesdropping [step 1405] (FIG. 14). Source QKD endpoint 105a may determine if set {S} consists of an empty set [step 1410]. If so, all links/switches in the original QKD path have been tested and, therefore, processing may end. If not, source QKD endpoint 105a selects another successive link/switch from set {S}as the current test link/switch [step 1415]. Processing then may return to step 1220 of FIG. 12.

CONCLUSION

Systems and methods consistent with the present invention, therefore, provide mechanisms for setting up a quantum key distribution path through a QKD network that may include multiple switches and links. Systems and methods consistent with the present invention may implement quantum cryptographic techniques to assure the confidentiality of encryption keys distributed across the set-up QKD path through the detection of eavesdropping on the QKD path. Systems and methods consistent with the present invention may route the distribution of encryption keys around any detected eavesdropping in the network and may, additionally, discover the location of an eavesdropper at a switch and/or link along the QKD path.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while certain components of the invention have been described as implemented in hardware and others in software, other configurations may be possible. Additionally, though QKD path set-up and teardown has been described as being brokered by a single QKD switch in QKD sub-network 115, one skilled in the art will appreciate that QKD path set-up and teardown may be accomplished via, for example, a distributed "hop by hop" path set-up protocol. Furthermore, a QKD endpoint itself may perform the QKD path set-up protocol without any brokering by a QKD switch. QKD path set-up may also be performed by specialized servers. These servers may receive the path set-up requests and send control messages to QKD switches in the path to set-up the QKD path.

Principles of quantum mechanics are not limited to any portion of the electromagnetic spectrum. Accordingly, and as earlier mentioned, embodiments of the present invention are not constrained to operate only within limits of the human-visible spectrum. Therefore, the terms "optical" and "photons", as used and claimed herein, are not necessarily referring to phenomena falling only within the human-visible light spectrum. These terms can be referring to phenomena occurring both within the infra-red and/or ultra-violet limits to the human-visible spectrum and beyond such limits as well. Moreover, quantum principles also apply to physical phenomena other than photons, for example, to entire atoms or their constituent components. Therefore, "light" should be understood in the broad sense of physical waves or particles, rather than its more restricted sense of photons.

While series of steps have been described with regard to FIGS. 6–14, the order of the steps is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the following claims and their equivalents.

What is claimed is:

1. A method of establishing a path for distributing data through a network, comprising:
    establishing a first data distribution path through the network, the network comprising at least one switch and one link;
    determining whether eavesdropping has occurred on the first data distribution path using quantum cryptography; and
    establishing a second data distribution path through the network based on the eavesdropping determination, wherein the second data distribution path comprises a different route through the network than the first data distribution path.

2. The method of claim 1, wherein the network comprises an optical network.

3. The method of claim 1, wherein the at least one switch comprises at least one optical switch.

4. The method of claim 1, wherein the at least one link comprises at least one optical link.

5. The method of claim 1, wherein the first data distribution path comprises a plurality of links and switches.

6. The method of claim 5, wherein the second data distribution path comprises a plurality of links and switches.

7. The method of claim 6, wherein the first data distribution path and the second data distribution path comprise no common links and switches.

8. The method of claim 6, wherein the first data distribution path and the second data distribution path comprise a subset of common links and switches.

9. The method of claim 1, wherein the first data distribution path comprises a first encryption key distribution path.

10. The method of claim 1, wherein the second data distribution path comprises a second encryption key distribution path.

11. The method of claim 9, further comprising:
    distributing a first encryption key via the first encryption key distribution path.

12. The method of claim 10, further comprising:
    distributing a second encryption key via the second encryption key distribution path.

13. A computer-readable medium containing instructions for controlling at least one processor to perform a method of establishing a path for distributing data through a network, the method comprising:
    initiating establishment of a first data distribution path through the network, the network comprising at least one switch and one link;
    determining whether eavesdropping has occurred on the first data distribution path using quantum cryptography; and
    initiating establishment of a second data distribution path through the network based on the eavesdropping determination, wherein the second data distribution path comprises a different route through the network than the first data distribution path.

14. A system for establishing a path for distributing data through a network, comprising:
   means for establishing a first data distribution path through the network, the network comprising at least one switch and one link;
   means for determining whether eavesdropping has occurred on the first data distribution path using quantum cryptography; and
   means for establishing a second data distribution path through the network based on the eavesdropping determination, wherein the second data distribution path comprises a different route through the network than the first data distribution path.

15. A system for establishing a path for distributing data through a network, comprising:
   a switch configured to establish a first encryption key distribution path through the network, the first encryption key distribution path comprising a plurality of switches and links; and
   a data distribution endpoint configured to determine whether eavesdropping has occurred on the first encryption key distribution path using quantum cryptography,
   wherein the switch is further configured to establish a second encryption key distribution path through the network responsive to the eavesdropping determination, the second encryption key distribution path comprising a plurality of switches and links.

16. A method of routing around eavesdroppers in a network, comprising:
   establishing a first path in the network;
   transmitting data symbols over the first path;
   identifying eavesdropping on the first path using quantum cryptography;
   establishing a second path in the network responsive to the eavesdropping identification, wherein the second path comprises a different route through the network than the first path; and
   transmitting data symbols over the second path.

17. The method of claim 16, wherein the network comprises an optical network.

18. The method of claim 16, wherein the at least one switch comprises at least one optical switch.

19. The method of claim 16, wherein the at least one link comprises at least one optical link.

20. The method of claim 16, wherein the first path comprises a plurality of links and switches.

21. The method of claim 20, wherein the second path comprises a plurality of links and switches.

22. The method of claim 21, wherein the first path and the second path comprise no common links and switches.

23. The method of claim 21, wherein the first path and the second path comprise a subset of common links and switches.

24. The method of claim 16, wherein the data symbols comprise at least a portion of an encryption key.

25. The method of claim 16, wherein the data symbols comprise polarized photons.

26. A quantum encryption key distribution device, comprising:
   a transceiver; and
   a processing unit configured to:
      establish a first key distribution path in the network, the first key distribution path comprising a plurality of links and switches,
      transmit at least a portion of a first encryption key over the first key distribution path via the transceiver,
      identify eavesdropping on the first key distribution path using quantum cryptographic techniques,
      establish a second key distribution path in the network responsive to the eavesdropping identification, the second key distribution path comprising a plurality of links and switches, and
      transmit at least a portion of a second encryption key over the second key distribution path via the transceiver.

27. A system for routing around eavesdroppers in a network, comprising:
   means for establishing a first path in the network;
   means for transmitting data symbols over the first path;
   means for identifying eavesdropping on the first path using quantum cryptography;
   means for establishing a second path in the network responsive to the eavesdropping identification, wherein the second path comprises a different route through the network than the first path; and
   means for transmitting data symbols over the second path.

* * * * *